United States Patent [19]
DeLuca

[11] Patent Number: 5,973,723
[45] Date of Patent: Oct. 26, 1999

[54] SELECTIVE COMMERCIAL DETECTOR AND ELIMINATOR APPARATUS AND METHOD

[76] Inventor: Michael Joseph DeLuca, 1104 Claire Ave., Austin, Tex. 78703

[21] Appl. No.: 08/989,625

[22] Filed: Dec. 12, 1997

[51] Int. Cl.⁶ .................................................. H04N 7/10
[52] U.S. Cl. ................................ 348/9; 348/10; 348/907; 345/328
[58] Field of Search .................................. 348/1, 907, 10, 348/12, 6, 9, 552, 563–565; 345/328; 455/2, 6.1, 6.2, 6.3

[56] References Cited

U.S. PATENT DOCUMENTS

| | | |
|---|---|---|
| 4,752,834 | 6/1988 | Koombes . |
| 4,918,531 | 4/1990 | Johnson ................................... 348/565 |
| 4,979,047 | 12/1990 | Wine . |
| 5,121,476 | 6/1992 | Yee .......................................... 348/10 |
| 5,151,788 | 9/1992 | Blum ....................................... 348/907 |
| 5,343,251 | 8/1994 | Nafeh . |
| 5,355,161 | 10/1994 | Bird et al. ............................... 348/907 |
| 5,448,372 | 9/1995 | Axman et al. . |
| 5,521,841 | 5/1996 | Arman et al. ........................... 345/328 |
| 5,550,965 | 8/1996 | Gabbe et al. . |
| 5,572,246 | 11/1996 | Ellis et al. ............................... 348/907 |
| 5,640,320 | 6/1997 | Jackson et al. ......................... 364/192 |
| 5,649,283 | 7/1997 | Galler et al. ............................... 455/2 |
| 5,659,742 | 8/1997 | Beattie et al. . |
| 5,668,917 | 9/1997 | Lewine .................................... 348/907 |
| 5,708,477 | 1/1998 | Forbes ..................................... 348/907 |
| 5,805,156 | 9/1998 | Richmond et al. ..................... 345/328 |
| 5,822,019 | 10/1998 | Takeuchi ................................. 348/722 |

*Primary Examiner*—Andrew I. Faile
*Assistant Examiner*—Reuben Brown

[57] ABSTRACT

A device contains a plurality of prestored program clips corresponding to portions of program information for presentation to a user. A comparator compares the program clips with with program information and causes selection of an alternate program in response to a match. In one embodiment, the program information corresponds to a television program and a program clip corresponds to a video frame at the beginning of an undesirable commercial, resulting in a television that automatically selects an alternate program in response an original program having an undesirable commercial. After a predetermined time associated with the video clip the television automatically returns to the original program. The invention also enables creation of new program clips based upon received program information.

12 Claims, 3 Drawing Sheets

SELECTIVE COMMERCIAL DETECTOR AND ELIMINATOR APPARATUS AND METHOD

FIELD OF THE INVENTION

This invention relates generally to the area of automatic program selection and more specifically to automatic program selection for television and other types of programs having program information for presentation to a user.

BACKGROUND OF THE INVENTION

Television and radio industry have developed and thrived with the advent of entertaining program information sponsored by commercial interests. The commercial interests underwrite production of entertainment portion of broadcasts in exchange for brief interruption of the entertainment portion with advertising program segments, commonly referred to as commercials. While some commercials are themselves entertaining to some viewers, or human users, other commercials are found to be more objectionable than entertaining. Therefore, what is needed is a device and method for eliminating commercials which may be objectionable to a user.

Prior methods have used changes in audio levels or picture characteristics to determine a change from the entertainment portion of the broadcast to a commercial portion of the broadcast. These methods have several disadvantages. First, the characteristics indicative of a commercial may also occur in the entertainment portion causing the method to improperly detect the presence of a commercial and interrupt the desired entertainment portion of a broadcast. Second, the duration of the interruption may be incorrect as differing commercials have different durations. And third, some of the commercials are themselves entertaining, and even could be undesirably eliminated. Finally, some prior methods have processed program information recorded and stored locally, on a video cassette recorder for example, to determine if a periodicity of the change in characteristics match a typical commercial duration in order to determine the presence of a commercial. However this method does not work in a real time broadcast of television information and also eliminates commercials which a user may find desirable.

Thus, what is needed is a method and device for selectively and accurately eliminating commercials, or other program information, having variable intervals during the broadcast of the program.

DETAILED DESCRIPTION

Figure 1:
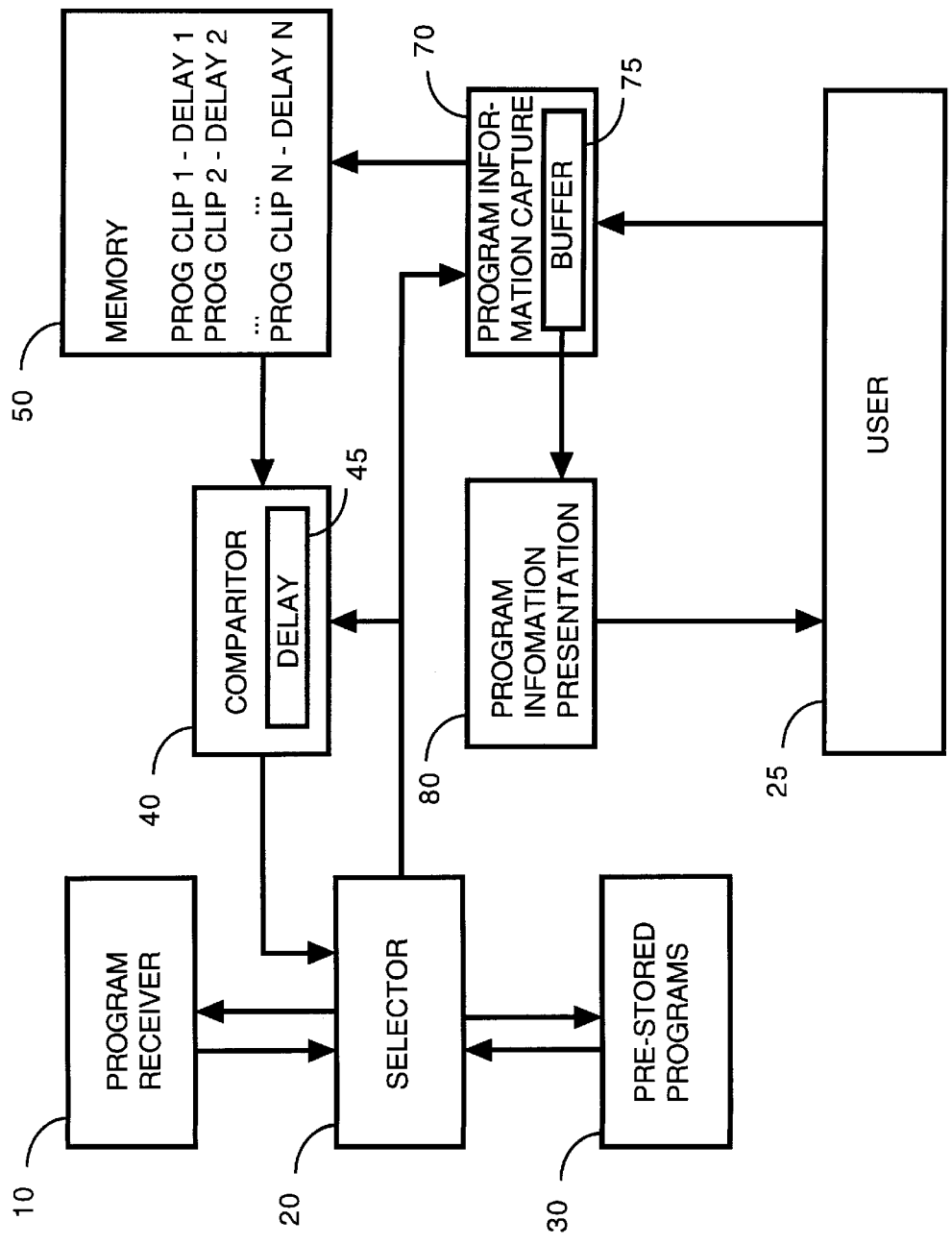
FIG. 1 show a block diagram of a selective commercial detector and eliminator apparatus operating in accordance with the present invention.

FIG. 1 show a block diagram of a selective commercial detector and eliminator apparatus operating in accordance with the present invention. Program receiver 10 receives programs, such as television broadcast programs broadcast by ground based antennas, or other means such as satellite or cable networks. Program receiver 10 is controlled by selector 20, which causes the program receiver to selectively receive, or tune in various programs in a manner known to those familiar with the art.

Program receiver 10 may include more than one program receiver in order to provide for currently popular television features such as dual tuner picture in picture (PIP) for reception of multiple programs and presentation of multiple program information to the user 25. Prestored programs means 30 is also controlled by selector 20 and includes stored program information. Prestored programs means 30 is know to those familiar with the art and includes common devices such as video cassette recorders (VCR) or digital video disc players (DVD) or computer generated animations. The general operation of selector 20 in controlling program receiver 10 and prestored program means 30 in response to signals from the user 25, typically in response to sequences entered on a remote control (not shown) by the user, is known to those familiar with the art.

The output of selector 20 is program information for presentation to the user and includes the video and audio signals ultimately seen and heard by the user. Comparator 40 digitizes and compares the audio and/or video program information with prestored program information from memory 50. Memory 50 includes predetermined information having at least one program clip. A program clip is representative of program information to be presented to the user. Preferably a program clip includes a digitized version of a video frame. Alternatively a program clip may represent the audio portion of a frame or a digitally compressed representation of the video frame. Methods of digital compression of a video frame are known to those familiar with the art. Alternately, a digitized version of a portion of an image, such as the portion of an image occurring at the center or some other portion of a display, may be processed. Alternately, only a portion of the presented information may be analyzed, such as a monochromatic version of the video image or only the audio portion of a frame. Comparator 40 compares a digital representation of each frame from selector 20 with each program program clip from memory 50. If there is a substantial match, then a detect signal is communicated to selector 20. Preferably, a match means a substantially identical video image from selector 20 and program clip in memory means 50. This is most readily done by a direct comparison of the digitized image from selector 20 with each program clip in memory 50. If there is an exact match, then the detect signal is generated. Means and methods for direct comparisons of data processed by comparator 40 are known to those familiar with the art. Comparator 40 includes at least one digital signal processor (DSP) for comparing a program clip with the digitized image. Multiple DSPs can be used to facilitate comparison of the digital image with multiple program clips. Further, allowances can be made for close matches in the comparison, allowing for variations including differing reception of the program, noise introduced in the reception of the program and differences introduced by digitization of the program information. In another embodiment, a detect signal may be generated in response to more than one frame matching a corresponding more than one program clip at occurring at predetermined time differences.

The invention takes advantage of the phenomena that undesirable program segments, such as some commercials, are repetitive. Undesirable commercials are comprised of video images which are substantially invariant from one broadcast to the next. By storing in memory 50 program clip representations of at least one video image representative of an undesirable commercial segment, then comparator 40 can identify the occurrence of an undesirable commercial and cause selector 20 to respond by generation of the detect signal. In response to the detect signal, selector 20 deemphasizes the current program by terminating presentation of the undesirable program information and emphasizes an alternate program by substituting the alternate program information. Or more simply, one embodiment of the invention automatically changes the channel when a frame of an undesirable commercial is detected. If program receiver 10 is a multi-tuner and the television has picture in picture capabilities, the selector may cause the undesirable program information to be deemphasized by placing it in a small PIP window, while the alternate program information is emphasized by occupying a larger display area. Selector 40 may select the alternate program from prestored programs means 30 which could be a VCR or DVD, or selector 40 may tune to another broadcast channel, depending upon a desired configuration.

Each program clip includes a corresponding delay. Upon detection of a match by comparator 40, delay means 45 begins timing the associated delay. Upon completion of the delay, delay means 45 generates a return signal, instructing selector 20 to return to the originally established program. This aspect of the invention takes advantage of the phenomena that undesirable programs segments have a predetermined duration. Thus, after a match is detected by comparator 40 and an alternate program selected, the selector return to the original program after a predetermined time, and after completion of the undesirable commercial.

Each undesirable commercial has a corresponding program clip representative of a portion of the commercial. For example, an undesirable sixty second commercial may have a program clip representative of a frame towards the beginning of the commercial and an associated delay of substantially sixty seconds while an undesirable thirty second commercial may have a program clip representative of a frame towards the beginning of the commercial and an associated delay of substantially thirty seconds. To facilitate "channel surfing", frequent program switching in response to user commands, an undesirable commercial may be represented by multiple program clips having various corresponding delays. For example an undesirable thirty second commercial occupies up to thirty program clips. Each program clip representing an image occurring one second after a prior image, and each program clip having a corresponding delay one second less than the corresponding delay of the prior program clip. In this way, an undesirable commercial will be detected within one second of changing the channel to a program presenting the middle of the undesirable commercial. The number of images and the duration between images stored in program clips may be varied while remaining within the scope of the invention. It should further be appreciated that comparator 40 may also processes program information from prestored programs from means 30 as well as from programs received from receiver 10, thereby eliminating commercials or other undesirable program portions from prestored programs.

The program clips and corresponding delays stored in memory 50 may be externally loaded into the memory to establish and update the ability of the invention to spare the viewer from undesirable program segments. For example, the program clips can be updated by transferring the data from a floppy disc or downloaded via a modem connection to a commercial elimination service which provides appropriate program clips as a service to the user.

The invention also provides for the user to update the program clips in memory 50 by capturing program information from the program observed by the user, creating a program clip and determining a corresponding delay. In this way, the user may decide which program segments, or commercials, are undesirable and their associated delay. Program capture means 70 captures and stores in memory 50 a digitized representation of the program information in response to a capture signal from the user. The format of digitized representation corresponds to the representation from the selector 20 used by the comparator 40. The format may be in either compressed or uncompressed as previously discussed. For example if the user is watching program information and spots an undesirable commercial, a "capture button" on a remote control is pressed. This cause the program capture means 70 to store in memory 50 a digital representation of a video frame occurring is substantial coincidence with the capture signal. The user may then determine the corresponding delay, with may be initialized to thirty or sixty seconds and increased or decreased in response to signals from the user. Alternately, the user could wait until the end of the commercial, signal its end, and the associated delay calculated by the program information capture means to correspond to the elapsed program information time between the capture signal and signal indicating the end of the commercial. A buffer 75 greatly improves the accuracy of a user's determination of the beginning and ending of undesirable commercials by buffering the program information signal and allowing the user to fast forward or reverse the presentation of program information to more accurately cause the capture of a frame at the beginning of the commercial and determine the end of the commercial. Program capture means 70 may also be used to automatically and periodically create multiple program clips and associated delays for the duration of a commercial as previously discussed. Program information means 80 includes a television display for displaying the video portion of the program information and speakers for playing the audio portion of the program information.

Figure 2:
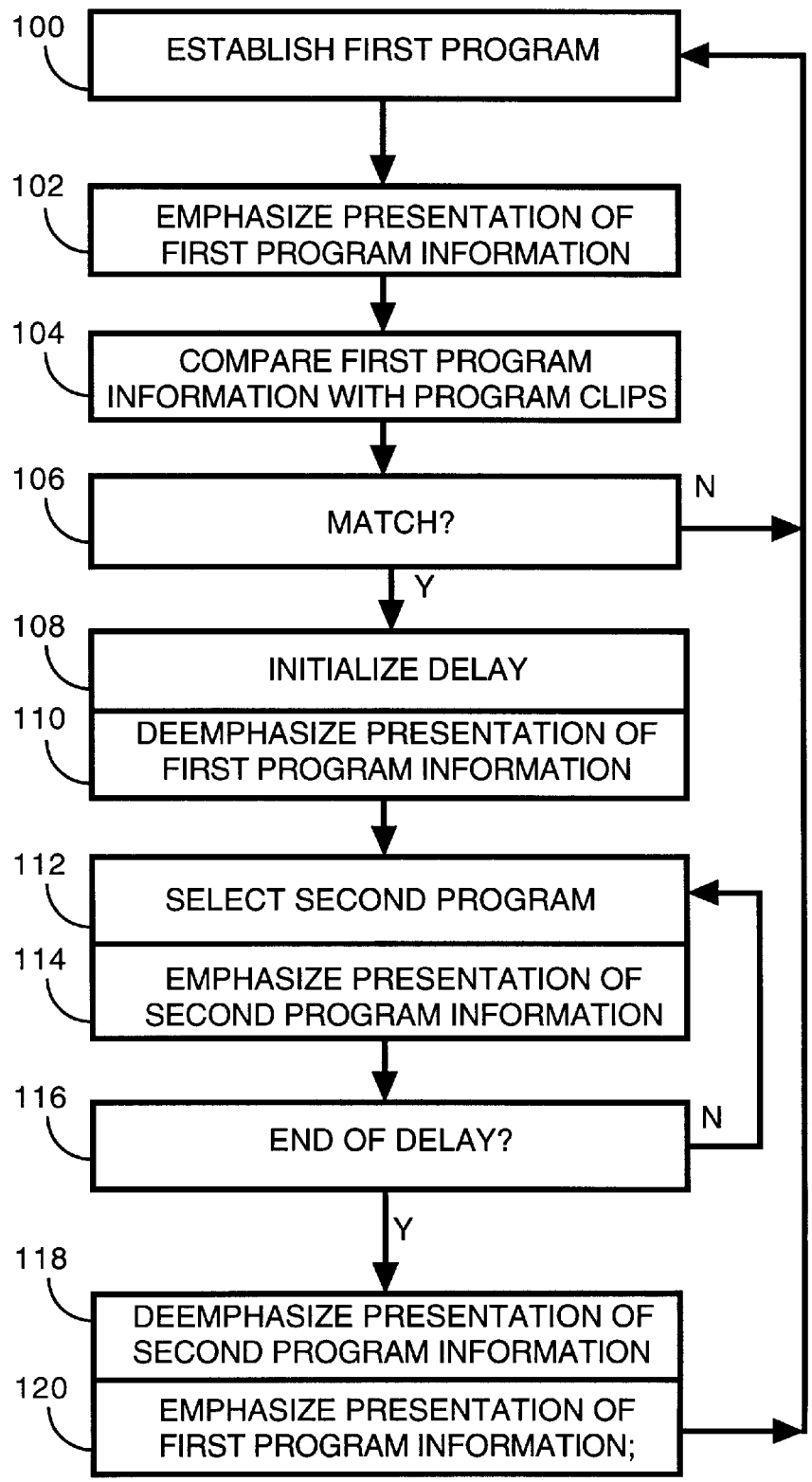
FIG. 2 shows a flow chart of a selective commercial detection and elimination method operating in accordance with the present invention.

FIG. 2 shows a flow chart of a selective commercial detection and elimination method operating in accordance with the present invention. In step 100 a first program is established. Establishing a first program may be done in a number of ways known in the art including tuning to a certain television channel or playing a program on a VCR or DVD. Step 102 emphasizes the first program information. In a simple embodiment, emphasizing the first program information corresponds to displaying the video portion of the program on the video display and playing the audio portion of the program on the speakers of a television. In a PIP or other type of multiple program presentation, this corresponds to making the first program information the primary information presented, giving the first program information the largest area of display and playing loudest the audio associated with the first program information. Other portions of the display may present other program information not necessarily associated with the first program information. Step 104 compares the first program information with the program clips. If no match is found in step 106 then the first program information continues to be emphasized. If a match is found, step 108 initializes the delay to be the delay associated with the matching program clip. Then in steps 110, 112 and 114, the first program information is deemphasized, a second program is selected and the second program information is emphasized. In a television presenting only a single program, this corresponds to terminating presentation of the first program information, changing a channel or otherwise selection a second program, and presenting the second program information. In a multiple program presentation television, this corresponds to making the second program information the primary information presented. In a PIP television this corresponds to giving the second program information the largest area of display and playing loudest the audio associated with the second program information. Other portions of the display may present the first program information and the audio portion of the first program information may be reduced or muted. Selection of the second program may be in any of a number of ways know in the art, for example selection of a previous program prior to establishing the first program, or selection of a prestored program or a predetermined channel. Furthermore, the invention can be adapted to monitor the second program information in parallel with the presentation of first program information to assure that an undesirable program segment is not occurring on the second program prior to step 112, in which case a third program would be selected. Step 116 checks for the end of the delay of step 108. If not ended, the flow returns to step 112. During the execution of steps 112 to 116, other programs could be select by the user or otherwise without modifying the delay of step 108 or returning to the first established program set at step 100.

At the end of the delay, step 118 deemphasizes presentation of the second program information and emphasizes presentation of the first program information in a manner previously discussed. This returns presentation of the first program information to the user after the undesirable program segment has been completed, thereby eliminating the undesirable commercial. Furthermore, the invention may monitor the second program information at step 114 for presentation of undesirable program segments and switch to yet a another program during the delay established at step 108. Preferably, the delay at step 108 would remain unmodified by a finding of an offensive commercial at step 114 and step 120 would restore or emphasize the first program information at the end of the delay. It can be further appreciated that a multiple program television can "look ahead" to the first program about the time of the end of the delay, without emphasizing the first program information, to check for a subsequent undesirable program segment prior to emphasizing the first program information. This would avoid potentially objectionable rapid program changing by the invention resulting from switching to a new channel also displaying an offensive commercial detected by comparator 40 and switching to yet another new channel in response thereto.

Figure 3:
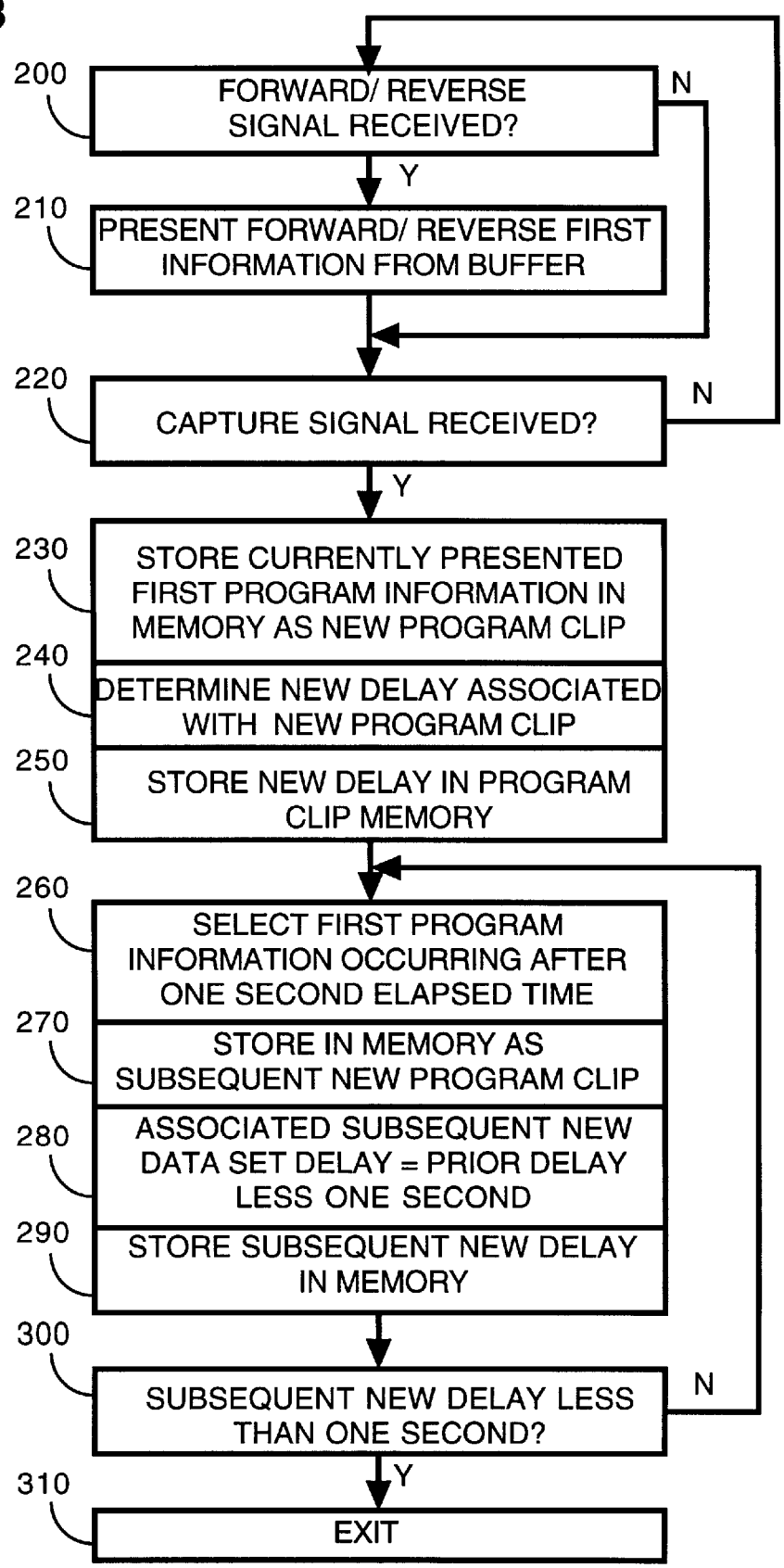
FIG. 3 shows a flow chart for user generation of program clips from received program information.

FIG. 3 shows a flow chart for user generation of program clips from received program information. Step 200 checks for a forward/reverse signal to be received from the user. In this step contents of buffer 75 are displayed in a sequence to make the program appear to move backward or fast forward in time according to the commands of the user. For example, buffer 75 stores one hundred and twenty seconds of digitized program information and is updated as new program information is produced by selector 20. The output of the buffer may be taken from portion of the buffer and is fed to the program information presentation means. If the output were taken at the mid point of the buffer, then in response to a fast forward command, the output of the buffer would advance in time to more recent program information, step 210. Likewise, in response to a reverse command, the output of the buffer would retard in time to more delayed program information, step 210. By this method, the user can determine an appropriate frame for a beginning of a commercial. In alternate embodiments the amount of program information stored in buffer 70 may be increased or decreased, and the advancement of program information through the buffer halted in order to better determine the beginning of a commercial. When a capture signal from the user is received, at step 220, step 230 stores in memory 50 the currently presented first program information as a new program clip. Thereafter a delay is determined at step 240. The delay can be an arbitrary delay selected by the user, such as thirty seconds, or the user can mark the end of the commercial with an end signal and the delay automatically determined as difference in program information time between the capture signal and the end signal. After determining the delay, the delay is associated with the program clip and stored in memory, step 250. Step 260 selects first program information occurring after one second of elapsed program information time, then in step 270 the selected program information is stored in as a subsequent new program clip and a subsequent new delay, less one second from the delay of the prior program clip, is determined, step 280, and stored in step 290. Then step 300 checks if the subsequent new delay is less than one second and if not returns to step 260. If true, then the procedure for capturing new program clips is exited at step 310.

It should be appreciated that numerous variations in the procedure may be made that enable capturing of new program clips from program information. For example for real time capture of new program clips, the buffer 70 and steps 200 and 210 may be eliminated. In this variation, a new program clip would be selected from program information presented in substantial coincidence with the capture signal. In this variation a small buffer could be added to account for average user reaction time and the program clip captured would be from program information occurring a fraction of a second before reception of the capture signal. As a further variation, only a single new program clip would be captured by eliminating steps 260–300. Furthermore, the new delay may be eliminated by eliminating steps 240 and 250, in which case the process of FIG. 2 would not return to the first program information, and steps 108, 116, 118 and 120 could also be eliminated. In this variation, the user could manually return to the first program at any chosen time.

FIG. 3 shows a process where the user chooses the program clips which are indicative of undesirable program segments. This has the advantage of enabling the user to choose to view commercials and other program segments which may be desirable, perhaps having some entertainment value, while allowing automatic elimination of other commercials or other program segments which the user finds objectionable. This has the further advantage of allowing new commercials, or other program segments to be viewed initially, and then giving the user the choice of determining the whether or not to view it again.

Furthermore, it should be appreciated that several users may have differing opinions of which commercials are objectionable. In an alternate embodiment, each user is associated with a unique set of program clips stored in memory. If one user was present, then the set of program clips associated with that user would be processed by comparator 40. If two users were present, then in response to user present signals, multiple sets of program clips associated with both users would be processed by comparator 40, thereby sparing both users from objectionable commercials or program segments.

In another alternative embodiment, program clips may be representative of highly desirable program information. In a multiple program receiver embodiment, deemphasized program information may be compared for highly desirable program information and then emphasized in response to detection of program information matching desirable program clips. Such program clips may include a melody associated with a favorite program, or an opening introduction of a favored program.

Although the preferred embodiment is described with respect to a television set, it should be appreciated that other embodiments are also anticipated and include audio only programs such as radio broadcasts or music recordings, and other video programs such as those generated by computers.

I claim:

1. A method for automatically selecting from a plurality of programs having program information for presentation to a user comprising the steps of:

establishing a first program from the plurality of programs for presenting first program information to the user;

comparing the first program information with predetermined information and generating a detect signal in response to the first program information substantially matching the predetermined information, wherein the predetermined information includes a plurality of program clips, each program clip representative of a portion of program information;

selecting a second program from the plurality of programs for presenting second program information to the user in response to the detect signal receiving a capture signal;

creating a new program clip corresponding to a portion of the first program information occurring in substantial coincidence with said step of receiving the capture signal;

setting a new delay associated with the new program clip;

creating a subsequent new program clip corresponding to a subsequent portion of the first program information occurring an elapsed time after said step of creating the new program clip;

determining a subsequent new delay associated with the subsequent new program clip substantially equivalent to the new delay less the elapsed time;

adding the new program clip to the plurality of program clips and;

adding the subsequent new program clip to the plurality of program clips.

2. The method according to claim 1 wherein the plurality of programs include at least first and second televisions programs, the first program information including a series of video images for presentation of the first television program to the user and the predetermined information includes a program clip representative of a predetermined video image wherein said step of establishing includes tuning a receiver to receive the first television program, said step of comparing compares a representation of at least one of the series of video images to the program clip, and said step of selecting includes tuning the receiver to receive the second television program.

3. The method according to claim 1 further comprising the steps of:

emphasizing presentation of the first program information to the user in response to said step of establishing; and in response to said step of selecting, deemphasizing presentation of the first program information and emphasizing presentation of the second program information to the user.

4. The method according to claim 3 further comprising the steps of:

delaying a predetermined time in response to the detect signal; and thereafter, deemphasizing presentation of the second program information and emphasizing presentation of the first program information to the user.

5. The method according to claim 1 wherein said step of comparing compares the first program information with each of the plurality program clips and generates the detect signal in response to a first of the plurality of program clips substantially matching the a portion of the first program information, the detect signal further including a corresponding first delay associated with the first program clip and the method further comprising the steps of:

delaying a predetermined time in response to the corresponding first delay; and selecting the first program for presenting first program information to the user after said step of delaying.

6. The method according to claim 1 wherein the predetermined information includes a plurality of program clips, each program clip representative of a portion of program information, the method further comprising the step of communicating a multiplicity of program clips from an external data base.

7. The method according to claim 1 further comprising the step of repeating said steps of creating the subsequent new program clip, determining the subsequent new delay, and adding the subsequent new program clip to the plurality of program clips during the new delay.

8. The method according to claim 1 wherein the first program information occurs in a predetermined sequence of presentation and the method further comprises the steps of:

buffering the first program information to create buffered first program information;

presenting the buffered first program information to the user such that the user may modify the sequence of presentation of the first program information, including reversing the sequence of presentation of the first program information; and said step of creating the new program clip includes selecting the new program clip from the buffered first program information presented in substantial coincidence with the occurrence of the capture signal.

9. A device for automatically selecting from a plurality programs having program information for presentation to a user, the device comprising:

a selector for selecting a first program of the plurality of programs for presenting first program information to the user;

a comparator for comparing the first program information with predetermined information and for generating a detect signal in response to a portion of the first program information substantially matching the predetermined information; and a delay means responsive to the detect signal for generating a return signal a predetermined amount of time after the detect signal, wherein said selector selects a second program of the plurality of programs for presenting second program information to the user in response to the detect signal and said selector selects the first program for presenting the first program information to the user in response to the return signal, wherein the plurality of programs include at least first and second television programs, the first program information including a series of video images for presentation of the first television program to the user and the predetermined information includes a program clip representative of a predetermined video image, the device further comprising a receiver for receiving either the first or second television program in response to a first or second tuning signal, respectively, and wherein said selector generates the first tuning signal to select the first television program and generates the second tuning signal to select the second television program, said comparator compares a representation of at least one of the series of video images with the program clip to generate the detect signal, and said comparator is coupled the program received by said receiver in response to said selector.

10. The device according to claim 9 further comprising:

a memory for storing the predetermined information, the predetermined information including a plurality of program clips, each program clip representative of a portion of program information, each program clip having a corresponding delay associated therewith, wherein, said comparator generates the detect signal in response to a first program clip of the plurality of program clips substantially matching a portion of the first program information, the detect signal further including a first delay signal corresponding to the delay of the first program clip, and said delay means generates the return signal in response to the predetermined amount of time corresponding to the first delay signal.

11. The device according to claim 10 wherein said memory is adapted to receive the predetermined information from a storage means external to the device.

12. The device according to claim 10 further comprising a program information capturing means for capturing program information for presentation to the user, generating a new program clip from the captured program information, determining a new delay associated with the new program clip, and storing the new program clip in said memory in response to a capture signal.

* * * * *